United States Patent [19]

Buchenau et al.

[11] Patent Number: 4,973,342
[45] Date of Patent: Nov. 27, 1990

[54] DEVICE WITH GRANULAR BED FILTERS FOR RAW GAS PURIFICATION

[75] Inventors: Rolf Buchenau; Hartmut Hederer, both of Dortmund; Dieter Victor, Waltrop; Rainer Dürrfeld, Essen; Bernard Schleper, Oberhausen; Harald Hoffmann, Much, all of Fed. Rep. of Germany

[73] Assignees: Uhde GmbH, Dortmund; Ruhrkohle Öl und Gas GmbH, Bottrop; Hoechst AG, Frankfurt am Main; Klöckner-Humboldt-Deutz AG, Cologne, all of Fed. Rep. of Germany

[21] Appl. No.: 417,021

[22] Filed: Oct. 4, 1989

[30] Foreign Application Priority Data

Oct. 4, 1988 [DE] Fed. Rep. of Germany ....... 3833661

[51] Int. Cl.$^5$ .............................................. B01D 45/00
[52] U.S. Cl. .................................................... 55/479
[58] Field of Search ..................... 55/99, 79, 479, 350, 55/512, 474; 34/171

[56] References Cited

U.S. PATENT DOCUMENTS

| 735,191 | 8/1903 | Allert | 55/350 |
| 2,270,903 | 1/1942 | Rudbach | 55/79 |
| 2,780,310 | 2/1957 | Schaub | 55/79 |
| 4,067,704 | 1/1978 | Zenz | 55/99 |

FOREIGN PATENT DOCUMENTS

| 2117088 | 10/1972 | Fed. Rep. of Germany . | |
| 3311108 | 9/1984 | Fed. Rep. of Germany . | |
| 3636467 | 4/1988 | Fed. Rep. of Germany . | |
| 894645 | 12/1944 | France | 55/479 |

Primary Examiner—Bernard Nozick
Attorney, Agent, or Firm—Toren, McGeady & Associates

[57] ABSTRACT

A device for separating coarse and/or fine particles from raw gas, including a filter shell with an inlet and an outlet for bulk material, granular bed filters reaching into the raw gas inlet duct, and purified gas outlets communicating with a common outlet duct.

9 Claims, 1 Drawing Sheet

DEVICE WITH GRANULAR BED FILTERS FOR RAW GAS PURIFICATION

BACKGROUND OF THE INVENTION

The invention relates to a device for separating coarse and/or fine particles from raw gas. Such devices are made up of a filter shell with an inlet and an outlet for the bulk material, granular bed filters, each reaching into the raw gas inlet duct, and purified gas outlets communicating with a common outlet duct.

In order to purify the raw gas laden with coarse and fine particles, granular bed filters are used, the beds which are inclined so as to permit easy withdrawal of the laden filter layer and refilling with fresh material via a vertical inlet duct. Such a design is, for instance, described in German Pat. Applications No. 33 11 108 and 36 36 467. The removal of the laden granular beds by mechanical means is, for instance, described in DE-OS 21 17 088, which provides for filters whose entire surface area is especially in one plane.

The known devices require a relatively large space for the surface area and bed of the filters. Moreover, they are not suitable for raw gas processed at a positive pressure because they cannot be installed in pressure vessels or if they were, such vessels would be of a size and weight that would not permit vessel manufacture on a reasonable cost basis.

SUMMARY OF THE INVENTION

Accordingly, it is an object of the present invention to provide a device which permits the purification of gases at a positive pressure by means of granular bed filters, while their easy removal, maintenance and refilling is ensured.

Pursuant to this object, and others which will become apparent hereafter, one aspect of the present invention resides in granular bed filters arranged one above the other in a pressure vessel housing. The stacked filter arrangement permits the construction of relatively slender vessels, and facilitates the use of such pressure vessels. Depending on the number of stacked filters, the surface area of the bed filters can be chosen to meet specific requirements. It is also possible to vary the number of filters during operation, for example, when a smaller filter surface area is required, some filters are shut down, and then restarted to provide a larger surface area.

According to a further embodiment of the invention, the filter shell is divided into an upper section and a lower section, the granular bed filters being firmly attached to one of the sections.

Depending in the shell section arrangement, the section that has no internals is unbolted and lifted or withdrawn downwards. Thus, the components attached to the other shell section are easily accessible and their maintenance is substantially facilitated. According to the configuration of side-by-side filter surfaces mentioned above in connection with the prior art, the present invention also provides for granular bed filters that are likewise attached to one side and inclined in the same direction so that the state-of-the-art advantages of regeneration or change of the granular bed (sand, etc.) can be fully utilized.

In still another embodiment, the outlet duct for the purified gas which communicates with all stacked filters is arranged laterally and the raw gas inlet duct, which has openings for all stacked filters and the outlet duct, is arranged on the opposite shell side.

It is recommended that the bulk material inlets of all granular bed filters communicate with a common inlet duct or that each filter be equipped with a separate bulk material inlet. However, the bulk material outlet duct should be connected to all filters and also to the raw gas inlet duct in order to achieve a pressure balance in all sections of the device that come into contact with raw gas. Hence, there is a balanced flow pattern of gas-permeable filter beds and those to be regenerated facilitating substantially the operation and control of the device.

It is self-evident that the collecting bin outlet is equipped with a pressure, lock, which also applies to the bulk material inlet.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

The device (1) as shown in the above-mentioned Figures consists of a pressure vessel (2) with an upper shell section (3) and a lower shell section (4).

Figure 1:
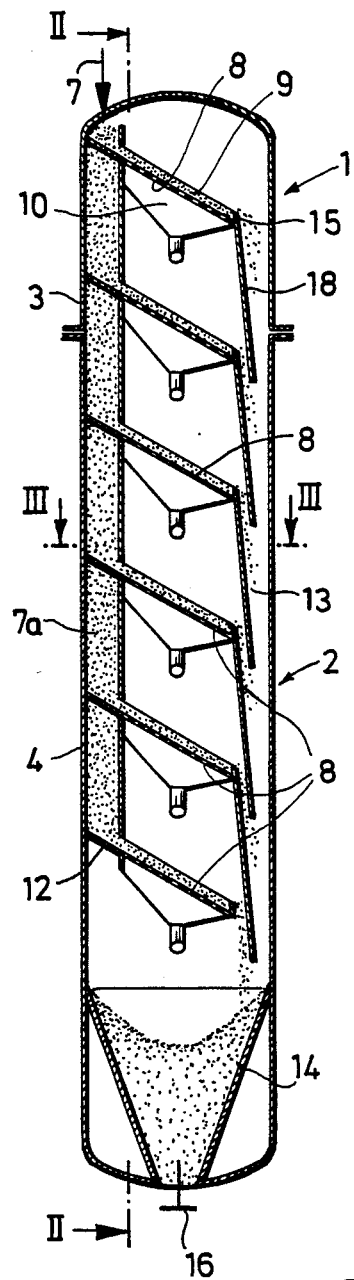
FIG. 1 is a sectional view of a device pursuant to the present invention.

Upper shell section (3) has a raw gas inlet (5), a purified gas outlet (6) (see arrow in FIG. 2) and a bulk material inlet (arrow marked 7 in FIG. 1).

Various inclined gas-permeable trays (8) with granular beds (9) are provided; and purified gas headers (10) are mounted under each filter and connected to the purified gas outlet duct (6 a).

Figure 3:
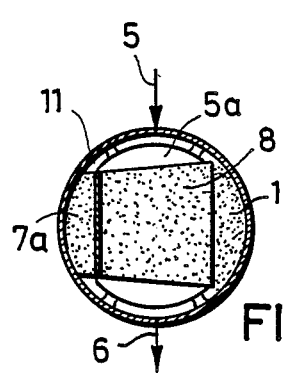
FIG. 3 is a cross-sectional view along the line III—III in FIG. 1.

The FIGS. show that the trays (8) carrying the beds (9) communicate with bulk material inlet duct (7 a), details being shown in FIG. 3. The collecting sections of the filters project into the inlet duct (7 a) leaving a free space for overflow ducts 11, and a bottom tray (12) closes the entire cross-section of the inlet duct (7 a).

An inlet duct (13) located opposite the inlet duct (7 a) extends from an overflow (15) down to a collecting bin (14) emptied via a lock device (16), now shown in the Figures Duct (13) also communicates with raw gas inlet (5).

Figure 2:
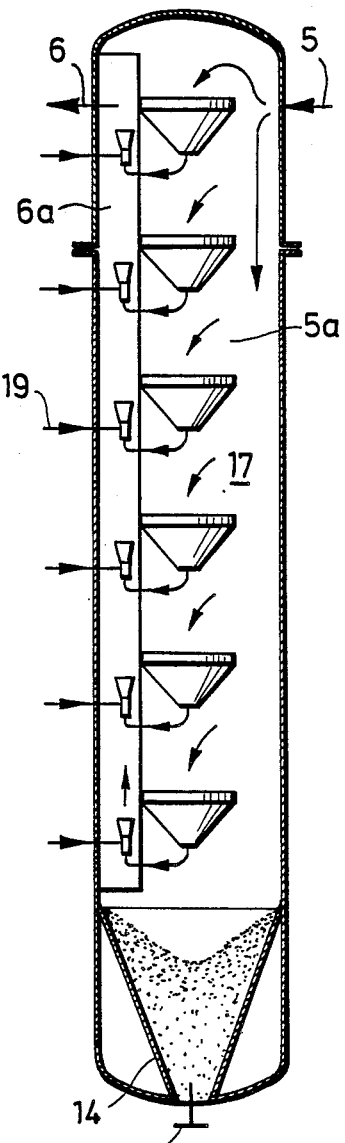
FIG. 2 is a sectional elevational along the line II—II in FIG. 1.

The following process takes place in the device:

The raw gas entering through nozzle (5) flows to the decks (17) in FIG. 2. When all the filters are opened, the raw gas passes through the beds (9) and the filter trays (8) into the headers (10) and flows into the common outlet duct (6 a), leaving the duct through the nozzle (6).

If individual filters become clogged, the top layer of these filters must be changed. Each filter can be shut down individually, either by closing the related purified gas header (10) or by increasing the pressure in the purified gas header via ejector nozzles (19) or other devices in order to obtain a differential pressure on the raw gas side.

The differential pressure ensures that the gas stream flows upwards through the layer of bulk material at a low velocity, which reduces the angle of repose. When the angle becomes smaller than the angle of inclination of the layer in the chamber, the laden top layer of the bed starts sliding downwards and falls into the outlet duct (13).

When the filter is re-connected, the gas stream is reversed and the bulk material remains in the bed because the angle of repose is larger than the angle of inclination in the chamber.

Vibrating or knocking devices may also be provided for the trays (8) in order to facilitate the removal of the laden layer. However, a device of this type is not shown in the Figures. The laden filter material can be withdrawn from the bottom section.

While the invention has been illustrated and described as embodied in a device with granulated filters for raw gas purification, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

What is claimed is:

1. A device for separating particles from raw gas, comprising:
   a longitudinal filter shell having an inlet and an outlet for bulk filter material;
   a raw gas inlet duct arranged in said shell;
   a purified gas outlet duct arranged in said shell; and
   granular bed filters stacked in said shell and arranged so as to reach into the raw gas inlet duct, each of said filters having a gas-permeable tray which carries the bulk filter material, said purified gas outlet duct being a common duct into which purified gas enters after leaving said bed filters, the inlet and outlet for bulk filter material communicating with the trays.

2. A device according to claim 1, wherein said filter beds have filter surfaces arranged on an upper side thereof, said filter surfaces being inclined in a common direction.

3. A device according to claim 1, wherein said common purified gas outlet duct is a lateral duct having a length that covers all of the stacked granular bed filters.

4. A device according to claim 1, wherein each granular bed filter has a separate bulk material inlet with a collecting space.

5. A device according to claim 1, and further comprising a purified gas header mounted under each of the granular bed filters and connected to said common purified gas outlet duct.

6. A device according to claim 1, wherein said filter shell is divided into an upper shell section and a lower shell section, said granular bed filters being firmly attached to one of said shell sections.

7. A device according to claim 6, and further comprising a collecting bin, said raw gas inlet duct being arranged on a side of the shell opposite said purified gas outlet duct and having a length so as to cover all said stacked granular bed filters and communicate with said bed filters and the collecting bin.

8. A device according to claim 6, and further comprising a common bulk material inlet duct arranged in a gas-tight manner on an end side of the shell enclosing an upper edge of the filter surfaces so that bulk material inlets of said bed filters communicate therewith, a collecting space with an outlet being located near the upper edge of each filter surface.

9. A device according to claim 8, and further comprising an open bulk-material outlet duct arranged on an end of the shell opposite the bulk material inlet duct, said outlet duct being arranged so as to communicate with each of said filters via an overflow and so as to reach down to a funnel located in the lower shell section.

* * * * *